United States Patent
Lidsky

(10) Patent No.: US 12,510,964 B2
(45) Date of Patent: Dec. 30, 2025

(54) METHODS AND SYSTEM FOR INCREASING ADHERENCE TO NEUROFEEDBACK TRAINING BY APPLYING A MULTI-USER APPROACH

(71) Applicant: Ofer A. Lidsky, Ramat-Gan (IL)

(72) Inventor: Ofer A. Lidsky, Ramat-Gan (IL)

( * ) Notice: Subject to any disclaimer, the term of this patent is extended or adjusted under 35 U.S.C. 154(b) by 0 days.

(21) Appl. No.: 18/607,946

(22) Filed: Mar. 18, 2024

(65) Prior Publication Data
US 2024/0411368 A1    Dec. 12, 2024

Related U.S. Application Data

(60) Provisional application No. 63/452,491, filed on Mar. 16, 2023.

(51) Int. Cl.
*G06F 3/01*     (2006.01)
*G16H 20/70*    (2018.01)

(52) U.S. Cl.
CPC ............ *G06F 3/015* (2013.01); *G16H 20/70* (2018.01)

(58) Field of Classification Search
CPC ................. G06F 3/015; G16H 20/70
See application file for complete search history.

(56) References Cited

U.S. PATENT DOCUMENTS

2010/0240458 A1* 9/2010 Gaiba ............... A63F 13/42
                                                    463/36
2015/0298007 A1* 10/2015 Agrawal ............ A63F 13/795
                                                    463/42
2022/0338779 A1* 10/2022 Hung-Cuong Dinh ............
                                                    A61B 5/372

OTHER PUBLICATIONS

Nayak et al. (EEG Normal Waveforms, Jul. 31, 2021, NCBI) (Year: 2021).*
Daly BP, Creed T, Xanthopoulos M, Brown RT. Psychosocial treatments for children with attention deficit/hyperactivity disorder. Neuropsychol Rev. 2007;17(1):73-89. doi: 10.1007/s11065-006-9018-2. PMID: 17260167.
Jessica Van Doren et al. Sustained effects of neurofeedback in ADHD: a systematic review and meta-analysis. Eur Child Adolesc Psychiatry. 2019; 28(3): 293-305. Published online Feb. 14, 2018. doi: 10.1007/s00787-018-1121-4.
Sitaram, R., Ros, T., Stoeckel, L. et al. Closed-loop brain training: the science of neurofeedback. Nat Rev Neurosci 18, 86-100 (2017). https://doi.org/10.1038/nrn.2016.164.
Nayak CS, Anilkumar AC. EEG Normal Waveforms. In: StatPearls [Internet]. Treasure Island (FL): StatPearls Publishing; Jan. 2024—Available from: https://www.ncbi.nlm.nih.gov/books/NBK539805/.

* cited by examiner

*Primary Examiner* — Hang Lin
(74) *Attorney, Agent, or Firm* — The Roy Gross Law Firm, LLC; Roy Gross

(57) ABSTRACT

Methods and systems for comparing neuro-response data from a first user and a second user to affect the activity in a computer performed by the first user and the second user.

18 Claims, 2 Drawing Sheets

METHODS AND SYSTEM FOR INCREASING ADHERENCE TO NEUROFEEDBACK TRAINING BY APPLYING A MULTI-USER APPROACH

CROSS REFERENCE TO RELATED APPLICATIONS

This application claims the benefit of priority of U.S. Provisional Patent Application No. 63/452,491, filed Mar. 16, 2023, the contents of which are all incorporated herein by reference in their entirety.

FIELD OF THE INVENTION

The present invention is directed to methods and systems for increasing adherence to neurofeedback (NF) training.

BACKGROUND OF THE INVENTION

Attention Deficit Hyperactivity Disorder (ADHD) is a type of learning disorder with various symptoms such as inattentiveness, hyperactivity, and impulsivity, and may effect almost any aspect of person's life (school, work, and home). According to some estimates, more than 10% of all children have been diagnosed with ADHD at different levels at some point in their lives.

Medication, including methylphenidate and various amphetamine formulations have been used excessively for treatment of attention-deficit/hyperactivity disorder (ADHD). An increasing body of evidence suggests that for achieving maximal results, combining treatment approaches, like medication, in conjunction with psychosocial treatment are most effective for the short and long term [1,2]. For over a decade, a growing number of studies examining non-pharmacological treatments have been conducted and published. Neurofeedback (NF), which uses positive feedback enhancement targets self-regulation of brain activity (with fMRI, Magnetoencephalography (MEG) or electroencephalography (EEG)) using a brain-computer interface, has gained excessive popularity [2].

Neurofeedback is a psychophysiological procedure in which online feedback of neural activation is provided to the participant for achieving self-regulation. [3] In the process of neurofeedback, brain activation is intentionally regulated through learning; The different behavioral changes that are the result of NF treatment indicate that the physiological consequences of neurofeedback may be considered to be a form of endogenous neural stimulation [3].

NF is based on measurement of various brain waves as described by Chetan S. Nayak and Arayamparambil C. Anilkumar. [4] The beain waves include:
  Infra-slow oscillations (ISO) (less than 0.5 Hz): ISOs are mainly identified in the preterm neonates and appear as frequencies which are as low as 0.01 to 0.1 Hz and are termed as spontaneous activity transients (SAT). SATs represent endogenously, spontaneous activity which is important in the process of shaping neuronal connectivity at an early immature stage where sensory input has little or no role at all. [2] Additionally, ISOs at a wide range of frequencies (0.02 to 0.2 Hz) are also present during non-REM sleep, phase synchronized with higher frequency EEG activities [4].
  Delta waves (0.5 to 4 Hz): Delta type waves are seen in deep sleep, prominently in the frontocentral brain regions.
  Theta brain waves (4 to 7 Hz): Theta brain waves are predominant in drowsiness states as well as at early stages of sleep such as N1 and N2. It is most prominent in the fronto-central brain regions and slowly travels backward substituting the alpha rhythm due to early drowsiness. Theta brain waves also characterize heightened emotional states in children and young adults. Focal theta activity during awake states may be the result of focal cerebral dysfunction [4].
  Alpha brain waves (8 to 12 Hz): The posterior dominant alpha rhythm is present in normal awake EEG recordings in the occipital brain region and is the defining element of the normal background rhythm of the adult EEG recording. Fast variants of background alpha rhythm may be recorded in the normal population. The amplitude of alpha rhythm may differ between different individuals as well as at different times in the same individual.
  A specific type of Alpha brain waves is Mu rhythm which is found in the central brain regions. Mu waves typically disappears with the motor activity of the contralateral limbs or thinking about initiating motor activity. Mu waves are frequently registered in young adults and are not as common in children and the elderly. [4]
  Sigma brain waves: Registered in N2 sleep and is referred to as sleep spindles or sigma waves. Sigma brain waves may be slow (12 to 14 Hz) or fast (14 to 16 Hz) and are seen most prominently in the fronto-central parts of the brain.
  Beta brain waves (13 to 30 Hz): Beta waves are the most frequently seen waves in normal adults and children. Registered mainly in the frontal and central brain regions and attenuates as it goes posteriorly. The amplitude of beta activity is usually 10 to 20 microvolts, and rarely goes beyond 30 microvolts. It often increases in amplitude during drowsiness, N1 sleep and subsequently decreases in N2 & N3 sleep.
  Gamma brain waves and high-Frequency Oscillations (HFOs) (greater than 30 Hz): Brain waves with frequencies beyond 30 Hz are classified as gamma waves for 30 to 80 Hz; ripples for 80 to 200 Hz and fast ripples for 200 Hz to 500 Hz. Gamma brain waves traditionally have been attributed to sensory perception integrating different areas.

NF is a relatively long process which requires on average 30 to 40 sessions to manifest its full effect. However, usually a noticeable effect can be registered within 10-20 sessions. The fact that NF treatment requires repeated training sessions and the fact that it may take more than a month of training to achieve noticeable effects of the condition which is being treated makes the adherence to the NF treatment challenging. This is even more so when it comes to training and treatment of ADHD. With the application of at home training NF tools, the problem becomes even more acute as it depends on the willingness and motivation of the person getting the training or treatment without the support of the NF expert.

It is therefore required to provide a solution that will encourage people (mainly children) to adhere to NF treatment and make sure they complete most of the training program.

SUMMARY OF THE INVENTION

It is an object of the invention to provide systems and methods for increasing adherence to Neurofeedback training by applying a multi-user approach.

It is an object of the invention to provide systems and methods for multi-user neurofeedback training that will result in increased adherence and success of the training (for ADHD for example).

Objects of the invention are achieved by providing a method comprising the steps of: providing an electroencephalography (EEG) sensor to a first user; providing an EEG sensor to a second user; obtaining, via a processor, neuro-response data from the first user, wherein the first user performs an activity in a computer connected to the EEG sensor, and wherein the activity is affected by the neuro-response data; and obtaining, via a processor, neuro-response data from the second user, wherein the second user performs an activity in a computer connected to the EEG sensor, and wherein the activity is affected by the neuro-response data, wherein the neuro-response data of the first user affects the activity in a computer connected to the sensor of the second user and/or the neuro-response data of the second user affects the activity in a computer connected to the sensor of the first user.

In certain embodiments, the neuro-response data of the first user increases the effects of the activity in the computer connected to the sensor of the second user and/or the neuro-response data of the second user increases the activity in a computer connected to the sensor of the first user.

In certain embodiments, the neuro-response data of the first user decreases the effects of the activity in the computer connected to the sensor of the second user and/or the neuro-response data of the second user decreases the activity in a computer connected to the sensor of the first user.

In certain embodiments, the neuro-response data of the first user is first compared with the neuro-response data of the second user, followed by the neuro-response data of the first user affects the activity in a computer connected to the sensor of the second user and/or the neuro-response data of the second user affects the activity in a computer connected to the sensor of the first user.

In certain embodiments, the method further includes providing an EEG sensor to at least a third user to obtain neuro-response data from the third user, wherein the third user is doing an activity in a computer connected to the EEG sensor, wherein the activity is affected by the neuro-response data, and wherein the neuro-response data of the third user affects the activity in a computer connected to the sensor of the first or the second user and/or the neuro-response data of the first and/or the second user affects the activity in a computer connected to the sensor of the third user.

In certain embodiments, the method serves a plurality of users or multiple users.

In certain embodiments, the neuro-response data comprises brain waves of the type of: Infra-slow oscillations (ISO) (less than 0.5 Hz); Delta waves (0.5 to 4 Hz); Theta brain waves (4 to 7 Hz); Alpha brain waves (8 to 12 Hz); Mu brain waves; Sigma brain waves slow (12 to 14 Hz) or fast (14 to 16 Hz); Beta brain waves (13 to 30 Hz): Gamma (30 to 80 Hz); Ripples (80 to 200 Hz) and fast ripples (200 Hz to 500 Hz.

In certain embodiments, brain waves from the first user are measured and compared with brain waves of the second user.

In certain embodiments, ratios of different brain waves from the first user are compared with ratios of different brain waves of the second user.

In certain embodiments, the activity on the computer is selected from games, video games, learning exercises, stories, articles and other forms of media. In certain embodiments, the method increases adherence to neurofeedback (NF) training.

In certain embodiments, the method includes creating a script for a NF training session.

In certain embodiments, the method includes sending a transmission that the training session was completed or not completed.

In certain embodiments, the method includes sending a transmission that time has lapsed since last training session.

In certain embodiments, the method includes Neurofeedback training to promote Relaxation, Meditation, Peak Performance, focus, attention, neuromodulation and/or Cognitive Brain Training.

In certain embodiments, the method includes Neurofeedback training to decrease Depression, ADHD, and/or Anxiety.

Other objects of the invention are achieved by providing a method comprising the steps of: providing an electroencephalography (EEG) sensor to a first user; providing an EEG sensor to a plurality of users; obtaining, via a processor, neuro-response data from the first user, wherein the first user performs an activity in a computer connected to the EEG sensor wherein the activity is affected by the neuro-response data; and obtaining, via a processor, neuro-response data from the plurality of users, wherein the plurality of users perform an activity in a computer connected to the EEG sensor wherein the activity is affected by the neuro-response data, wherein the neuro-response data of the first user affects the activity in a computer connected to the sensor of the plurality of users and/or the neuro-response data of the plurality of users affects the activity in a computer connected to the sensor of the first user.

In certain embodiments, the computer is selected from a desktop computer, mobile computer, smart phone, tablet, server, or personal computer.

In certain embodiments, the computer includes a processor.

Other objects of the invention and its particular features and advantages will become more apparent from consideration of the following drawings and accompanying detailed description. It should be understood that the detailed description and specific examples, while indicating the preferred embodiment of the invention, are intended for purposes of illustration only and are not intended to limit the scope of the invention.

DETAILED DESCRIPTION OF INVENTION

In the following description, numerous details are set forth for the purpose of explanation. However, one of ordinary skill in the art will realize that the invention may be practiced without the use of these specific details.

The invention is directed to systems and methods for increasing adherence to Neurofeedback training by applying a multi-user approach. By providing such systems, increased adherence and success of the training is achieved.

In addition to providing a technical solution that will improve adherence and enhance the success of the NF training for problems such as ADHD, neurofeedback (NF) can be applied to other purposes such as meditation, peak performance and so forth, and the methods and systems provided can improve and enhance these purposes.

Figure 1:
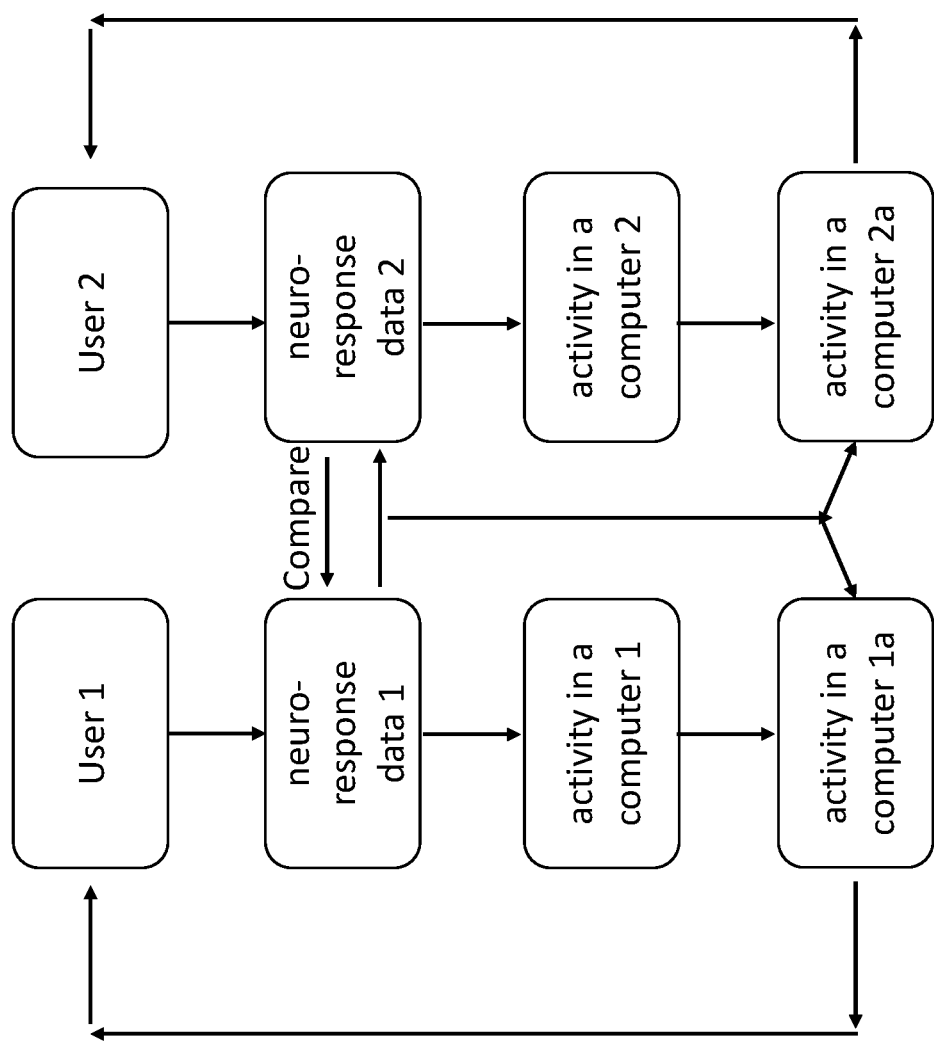
FIG. 1 shows a schematic whereby the neuro-response data of a first user is compared against neuro-response data of a second user.

As shown in FIG. 1, the proposed method includes providing a first user with an electroencephalography (EEG) sensor and a second user with an EEG sensor. EEG signals are collected from the sensors. Specifically, neuro-response data 1 is obtained from the first user and neuro-response data 2 is obtained from the second user.

After obtaining the data, the method involves the step of comparing neuro-response data 1 from the first user against the neuro-response data 2 from the second user. An arrow is shown making this comparison.

The activity in a computer 1 is affected by the comparison such that the neuro-response data of the first user affects the activity in a computer 2a connected to the sensor of the second user and/or the neuro-response data of the second user affects the activity in a computer 1a connected to the sensor of the first user.

The fact that EEG signals are collected during training from the two participants connected to a computer, compared and those signals create an effect on the activities taking place in the computer of the second user wherein the goal is to make user adhere to the training.

In certain embodiments, the users are playing a game. In certain embodiments, the game is a competitive game of rope whereby the user is more focused and pulls the rope towards his side until he wins or each user is driving a car with his attention.

In certain embodiments the users are playing a game and the game is collaborative such as for the purpose of example—lifting a large rock together with the attention levels of both users.

In certain embodiments the users are playing a game and the game is of mutual activity such as of drawing something with the attention on the computer screen.

Figure 2:
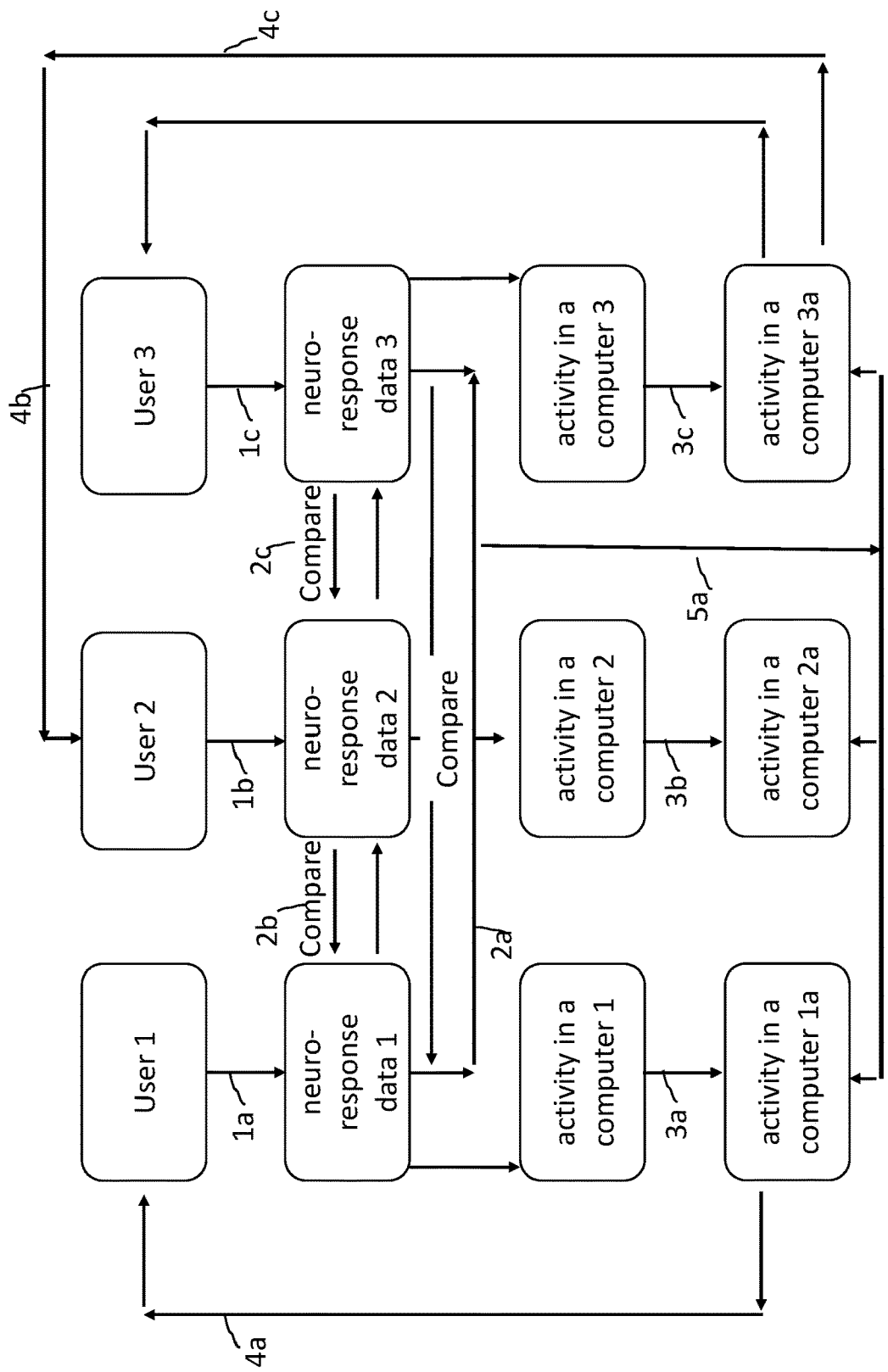
FIG. 2 shows a schematic whereby the neuro-response data of a first user is compared against neuro-response data of a second user and a third user.

In certain embodiments the first and second user performs an activity on a single computer or the first and second user performs an activity on two separate computers computer As shown in FIG. 2, a three user approach is provide. Each of user 1, user 2, and user 3 have neuro-response data 1, neuro-response data 2, and neuro-response data 3 respectively. The neuro-response data from the sensors of each of the users is compared with one another and then the activity in the computer 1, activity in the computer 2, and activity in the computer 3 is adjusted based upon the comparison of the neuro-response data FIGS. 1 and 2 show multiple feedback loops and multiple comparisons that increase adherence in an NF training session.

In certain embodiments, increasing adherence could be achieved by:
Creating a script for the training session (like a game script) where the user goes through levels and gets rewards as he progresses in the training/game.
Sending notification to parents that training session was completed/not completed, that time has lapsed since last training session so the parent can be more involved.
FIGS. 1 and 2 show multiple feedback loops and multiple comparisons that increase adherence in an NF training session. The feedback loops allow for increasing adherence to the NF training sessions thus increasing compliance and improving results.

Having thus described several embodiments for practicing the inventive method, its advantages and objectives can be easily understood. Variations from the description above may and can be made by one skilled in the art without departing from the scope of the invention.

Accordingly, this invention is not to be limited by the embodiments as described, which are given by way of example only and not by way of limitation.

REFERENCES

[1]. Daly B P, Creed T, Xanthopoulos M, Brown R T. Psychosocial treatments for children with attention deficit/hyperactivity disorder. Neuropsychol Rev. 2007; 17 (1): 73-89.
[2]. Eur Child Adolesc Psychiatry. 2019; 28 (3): 293-305. Published online 2018 Feb. 14. doi: 10.1007/s00787-018-1121-4 Sustained effects of neurofeedback in ADHD: a systematic review and meta-analysis Jessica Van Doren, 1 Martijn Arns, corresponding author2,3,4 Hartmut Heinrich,1,5 Madelon A. Vollebregt,4,6 Ute Strehl,7 and Sandra K. Loo8
[3] Closed-loop brain training: the science of neurofeedback Ranganatha Sitaram1, Tomas Ros2, Luke Stoeckel3, Sven Haller4, Frank Scharnowski5, Jarrod Lewis-Peacock6, Nikolaus Weiskopf7,8, Maria Laura Blefari9, Mohit Rana1, Ethan Oblak10, Niels Birbaumer11 and James Sulzer10
[4] StatPearls [Internet]. EEG Normal Waveforms Chetan S. Nayak; Arayamparambil C. Anilkumar. Last Update: Jul. 31, 2020.

The invention claimed is:

1. A method for increasing adherence to a neurofeedback training program by applying a multi-user approach, the method comprising the steps of:
providing an electroencephalography (EEG) sensor to a first user;
providing an EEG sensor to a second user;
obtaining, via a processor, neuro-response data from the first user, wherein the first user performs an activity in a computer connected to the EEG sensor, and wherein the activity is affected by the neuro-response data; and
obtaining, via a processor, neuro-response data from the second user, wherein the second user performs an activity in a computer connected to the EEG sensor, and wherein the activity is affected by the neuro-response data,
wherein the neuro-response data of the first user affects the activity in a computer connected to the sensor of the second user and/or the neuro-response data of the second user affects the activity in a computer connected to the sensor of the first user,
wherein the method comprises creating a script for a NF training session and sending a transmission that time has lapsed since last training session so the parent can be more involved, thereby increasing adherence to the neurofeedback training program.

2. The method of claim 1, wherein the neuro-response data of the first user increases the effects of the activity in the computer connected to the sensor of the second user and/or the neuro-response data of the second user increases the activity in a computer connected to the sensor of the first user.

3. The method of claim 1, wherein the neuro-response data of the first user decreases the effects of the activity in the computer connected to the sensor of the second user and/or the neuro-response data of the second user decreases the activity in a computer connected to the sensor of the first user.

4. The method of claim 1, wherein the neuro-response data of the first user is first compared with the neuro-response data of the second user, followed by the neuro-response data of the first user affects the activity in a computer connected to the sensor of the second user and/or the neuro-response data of the second user affects the activity in a computer connected to the sensor of the first user.

5. The method of claim 1, further comprising providing an EEG sensor to at least a third user to obtain neuro-response data from the third user,
   wherein the third user is doing an activity in a computer connected to the EEG sensor, wherein the activity is affected by the neuro-response data, and
   wherein the neuro-response data of the third user affects the activity in a computer connected to the sensor of the first or the second user and/or the neuro-response data of the first and/or the second user affects the activity in a computer connected to the sensor of the third user.

6. The method of claim 5, wherein the method serves a plurality of users or multiple users.

7. The method of claim 4, wherein the neuro-response data comprises brain waves of the type of: Infra-slow oscillations (ISO) (less than 0.5 Hz); Delta waves (0.5 to 4 Hz); Theta brain waves (4 to 7 Hz); Alpha brain waves (8 to 12 Hz); Mu brain waves; Sigma brain waves slow (12 to 14 Hz) or fast (14 to 16 Hz); Beta brain waves (13 to 30 Hz); Gamma (30 to 80 Hz); Ripples (80 to 200 Hz) and fast ripples (200 Hz to 500 Hz).

8. The method of claim 7, wherein brain waves from the first user are measured and compared with brain waves of the second user.

9. The method of claim 7, wherein ratios of different brain waves from the first user are compared with ratios of different brain waves of the second user.

10. The method of claim 1, wherein the activity on the computer is selected from games, video games, learning exercises, stories, articles and other forms of media.

11. The method of claim 1, wherein the method increases adherence to neurofeedback (NF) training.

12. The method of claim 1, further comprising sending a transmission that the training session was completed or not completed.

13. The method of claim 1, wherein the method promotes Relaxation, Meditation, Peak Performance, focus, attention, neuromodulation, and/or Cognitive Brain Training, and
   wherein the method decreases Depression, ADHD, and/or Anxiety.

14. The method of claim 1, wherein the method is performed on a single computer used by first and second user or two separate computers.

15. The method of claim 1, wherein the method is configured to be performed at home, at a lab for NF, hospital, and/or as self-training.

16. A kit for performing the method of claim 1, wherein the kit includes the EEG sensor and a computer.

17. A method for increasing adherence to a neurofeedback training program by applying a multi-user approach, the method comprising the steps of:
   providing an electroencephalography (EEG) sensor to a first user;
   providing an EEG sensor to a plurality of users;
   obtaining, via a processor, neuro-response data from the first user, wherein the first user performs an activity in a computer connected to the EEG sensor wherein the activity is affected by the neuro-response data; and
   obtaining, via a processor, neuro-response data from the plurality of users, wherein the plurality of users perform an activity in a computer connected to the EEG sensor wherein the activity is affected by the neuro-response data,
   wherein the neuro-response data of the first user affects the activity in a computer connected to the sensor of the plurality of users and/or the neuro-response data of the plurality of users affects the activity in a computer connected to the sensor of the first user,
   wherein the method comprises creating a script for a NF training session and sending a transmission that time has lapsed since last training session so the parent can be more involved, thereby increasing adherence to the neurofeedback training program.

18. A system for increasing adherence to a neurofeedback training program by applying a multi-user approach, the system comprising:
   an EEG sensor and a computer, wherein the system is configured to perform the following steps:
   provide an electroencephalography (EEG) sensor to a first user;
   provide an EEG sensor to a second user;
   obtain, via a processor, neuro-response data from the first user, wherein the first user performs an activity in a computer connected to the EEG sensor, and wherein the activity is affected by the neuro-response data; and
   obtain, via a processor, neuro-response data from the second user, wherein the second user performs an activity in a computer connected to the EEG sensor, and wherein the activity is affected by the neuro-response data,
   wherein the neuro-response data of the first user affects the activity in a computer connected to the sensor of the second user and/or the neuro-response data of the second user affects the activity in a computer connected to the sensor of the first user,
   wherein the method comprises creating a script for a NF training session and sending a transmission that time has lapsed since last training session so the parent can be more involved, thereby increasing adherence to the neurofeedback training program.

* * * * *